United States Patent

[11] 3,610,694

[72] Inventor John N. Bradley
 Grosse Pointe Woods, Mich.
[21] Appl. No. 879,227
[22] Filed Nov. 24, 1969
[45] Patented Oct. 5, 1971
[73] Assignee The Budd Company
 Philadelphia, Pa.

[54] LANCED GUTTER FOR AN INTEGRAL WHEEL
 3 Claims, 2 Drawing Figs.
[52] U.S. Cl. .................................................. 301/63 D,
 152/406
[51] Int. Cl. ...................................................... B60b 3/00,
 B60b 25/14
[50] Field of Search ............................................. 301/63, 63
 D; 152/406, 407, 408, 409, 410

[56] References Cited
UNITED STATES PATENTS
1,402,032 1/1922 Williams........................ 301/63

| | | | |
|---|---|---|---|
| 2,150,111 | 3/1939 | Tatter............................ | 301/63 X |
| 3,264,719 | 8/1966 | Adams .......................... | 301/63 UX |
| | | FOREIGN PATENTS | |
| 573,263 | 3/1933 | Germany....................... | 152/406 |
| 260,326 | 9/1928 | Italy .............................. | 152/408 |

Primary Examiner—Richard J. Johnson
Attorneys—Thomas I. Davenport, Edward M. Farrell, John D. Sowell, Alford L. Trueax, Jr. and William R. Nolte ABSTRACT: In an integral wheel formed by means such as a single stamping or spin forming, a gutter for retaining a side ring formed by lancing segments of the disk structure outwardly to provide a series of projections to cooperate with a side ring and retain the side ring and tire on the rim of the integral wheel.

PATENTED OCT 5 1971

3,610,694

INVENTOR.
JOHN N. BRADLEY
BY
*A. L. Trusov Jr.*
ATTORNEY

LANCED GUTTER FOR AN INTEGRAL WHEEL

This invention relates to an integral rim and disk structure of vehicle wheels and more particularly to a novel integral disk and rim with a series of projections for acting as a retaining shoulder for a side ring.

Some of the newer methods of forming wheels includes spin forming and single stamping of the combined integral disk and rim.

An object of this invention is to provide a series of retaining shoulders formed from the integral structure to replace a welded retaining ring to cooperate with and hold a side ring for retaining a tire on the rim.

Another object of this invention is to produce a less expensive vehicle wheel by reducing the amount of material in the wheel while retaining the desired strength and simplifying the method of manufacturing the wheel.

These and other objects of this invention will become more apparent as reference is made to the following specification and drawing.

Figure 1:
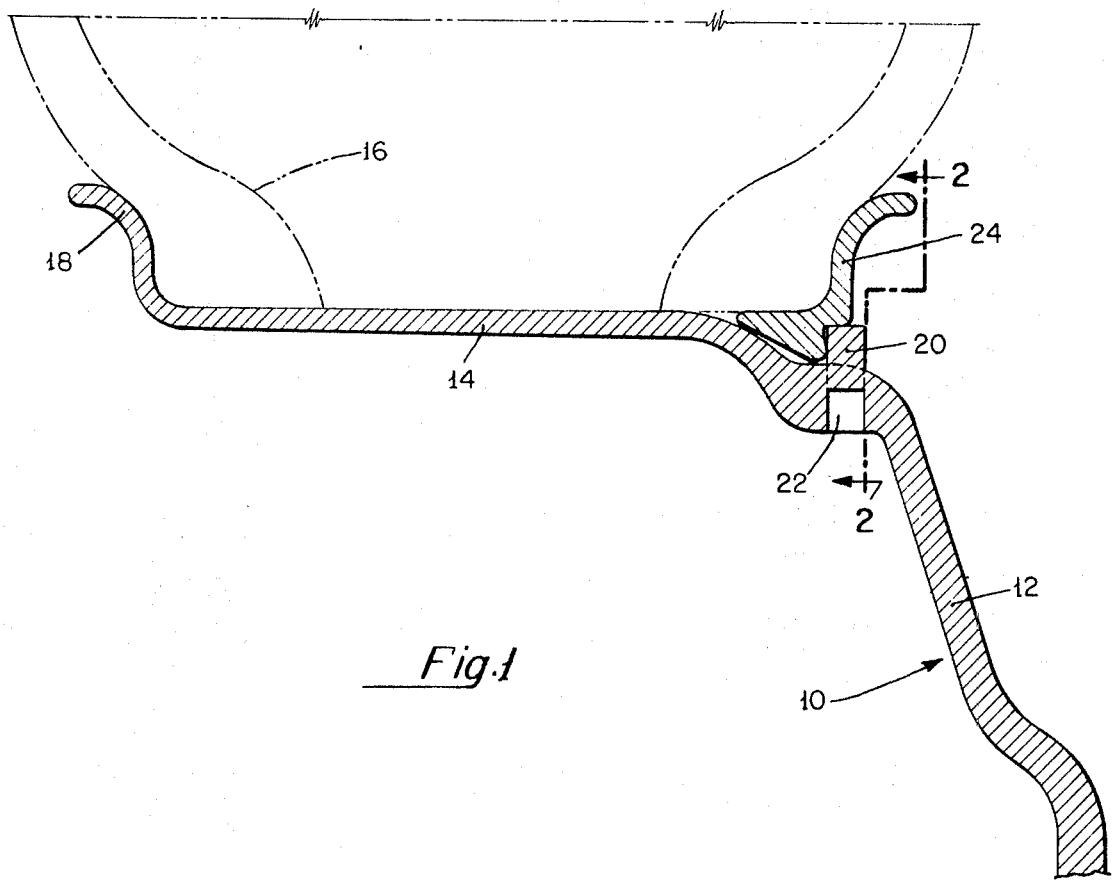
FIG. 1 is a cross-sectioned view of the novel wheel showing a tire in phantom lines mounted thereon.
Figure 2:
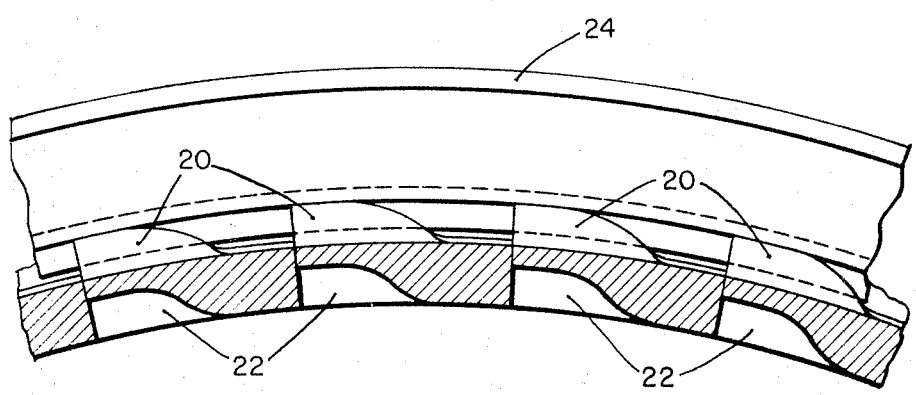
FIG. 2 is a view, in the direction of the arrows, substantially along line 2—2 of FIG. 1 illustrating the series of projections retaining the side ring and the cavities created by the projections.

Referring now to the drawings, as best seen in FIG. 1, an integral vehicle wheel 10 including a central disk portion 12 for securing the wheel to a vehicle and rim portion 14 for supporting a tire 16 thereon is shown.

The rim portion 14 has a side flange 18 extending radially from the outer edge and a series of projections 20 extending radially from a thickened section along the other edge of the rim portion. A series of cavities 22 are formed along the opposite side of the wheel where the projections were lanced from the gutter portion.

A conventional transversely divided side ring 24 is positioned on the projections 20 and engages and retains the tire 16 on the rim portion 14.

The integral disk and rim may be manufactured by either spin forming over an appropriate mandrel or stamped from a sheet of metal. The projections 20 are formed after the disk rim has been shaped. The projections 20 may be formed by individually lancing the projections one at a time, a single die-piercing operation or any of a number of other conventional operations.

The resulting wheel provides a unit that is lighter, more economical to manufacture and less expensive since less material is used in the simplified manufacturing operation.

1. What is claimed is:

1. An integral vehicle wheel for supporting an inflatable tire, said wheel including a central disk adapted for being secured to a vehicle, a rim extending axially from the outer portion of said disk, said rim including an integral side flange extending radially along the outer edge of the rim for retaining one side of the tire, a substantially level axially extending center portion for supporting a tire, an annular recessed gutter portion adjacent the disk and a series of integral lanced projections extending from the gutter portion for forming an interrupted shoulder along the inner edge of said rim said integral projections having a portion thereof extending circumferentially arcuately above the surface of said gutter for forming the interrupted shoulder and the remainder of said projections being below the surface of said gutter within the cavity of the projection for engaging said rim and strengthening said projection; and a transversely divided side ring engaging the interrupted shoulder and cooperating therewith to retain the other side of the tire.

2. The integral vehicle wheel as claimed in claim 1 wherein said gutter portion is enlarged to a heavier gage than the remainder of said wheel for providing a reinforced portion from which said projections are formed.

3. The integral vehicle wheel as claimed in claim 2 including a series of cavities on said wheel opposite said projections for providing a lighter wheel.